United States Patent [19]

Hashemi

[11] Patent Number: 5,135,560
[45] Date of Patent: Aug. 4, 1992

[54] GLASS SHEET SUPPORT RING

[75] Inventor: Amin B. Hashemi, Farmington, Mich.

[73] Assignee: Ford Motor Company, Dearborn, Mich.

[21] Appl. No.: 714,942

[22] Filed: Jun. 13, 1991

[51] Int. Cl.$^5$ .................... C03B 23/023; C03B 27/044
[52] U.S. Cl. .............................. 65/287; 65/348
[58] Field of Search .................. 65/268, 273, 287, 348, 65/349, 288

[56] References Cited

U.S. PATENT DOCUMENTS

| | | | |
|---|---|---|---|
| 2,297,315 | 9/1942 | Owen | 65/287 |
| 2,408,526 | 10/1946 | Minton | 65/287 |
| 3,089,319 | 5/1963 | Carson et al. | 65/288 |
| 3,310,273 | 3/1967 | Seymour | 65/287 |
| 3,846,104 | 11/1974 | Seymour | 65/104 |
| 3,973,943 | 8/1976 | Seymour | 65/348 |
| 4,077,792 | 3/1978 | Calevro et al. | 65/288 |
| 4,556,407 | 12/1985 | Fecik et al. | 65/289 |
| 4,556,408 | 12/1985 | Fecik et al. | 65/289 |
| 4,812,157 | 3/1989 | Smith | 65/273 |

Primary Examiner—Joye L. Woodard
Attorney, Agent, or Firm—Charles H. Ellerbrock; Clifford L. Sadler

[57] ABSTRACT

Apparatus for supporting a formed glass sheet during a tempering operation comprises a support rail, a plurality of glass sheet engaging elements, and means for affixing the elements to the support rail. The support rail generally conforms in outline and elevation to the peripheral marginal portion of the underside major surface of the formed glass sheet. The glass sheet engaging elements have bores therethrough and are aligned generally parallel to the support rail. A wire is disposed through the bores of the glass sheet engaging elements, and is affixed to the support rail at locations intermediate adjacent glass sheet engaging elements.

12 Claims, 1 Drawing Sheet

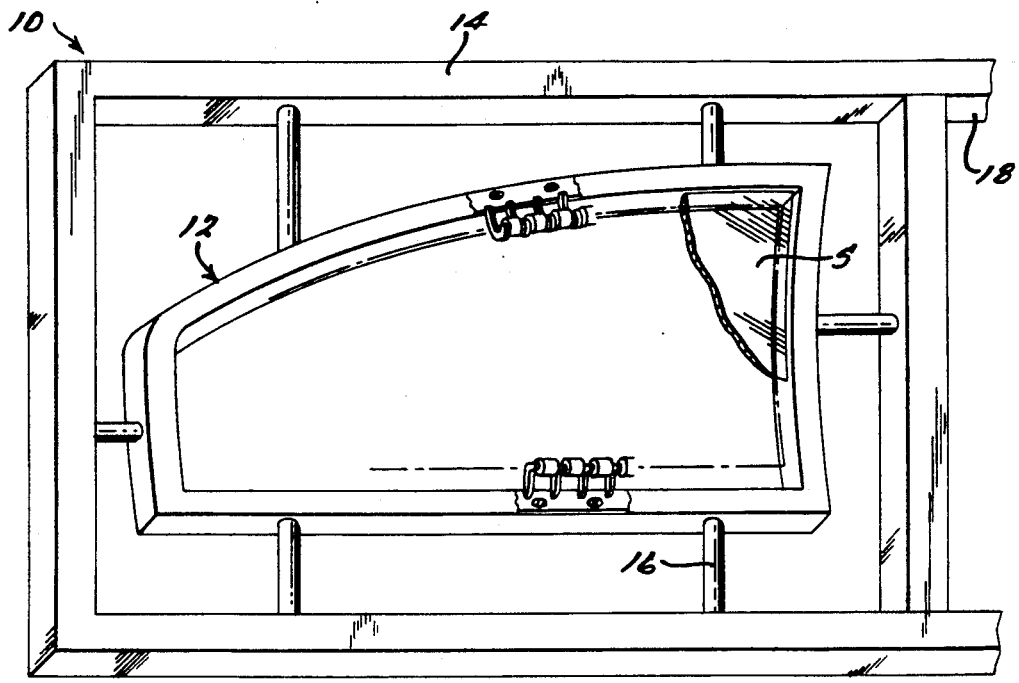
FIG. 1.
FIG. 2.
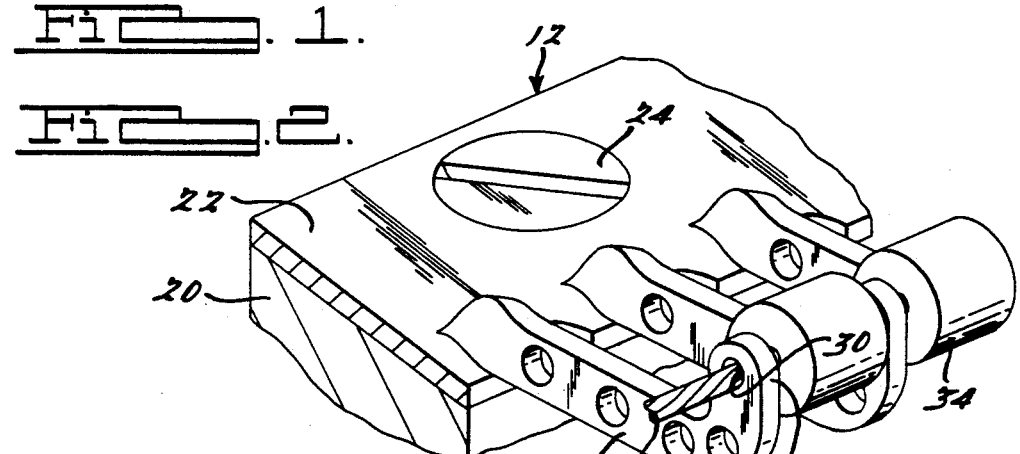
FIG. 3.   FIG. 4.   FIG. 5.   FIG. 6.   FIG. 7.

GLASS SHEET SUPPORT RING

FIELD OF THE INVENTION

This invention relates generally to a glass sheet support ring. More particularly, the invention relates to a mechanical ring structure for supporting a glass sheet during a glass tempering operation. The inventive ring configuration allows increased tempering fluid flow at the peripheral marginal portion of the underside major surface of the glass sheet (hereinafter referred to as the "peripheral marginal surface" of the glass sheet), and minimizes conductive heat transfer from the glass sheet to the ring thereby improving the tempered characteristics of the glass sheet.

BACKGROUND OF THE INVENTION

It is generally known in the art of manufacturing automotive glazings to heat a glass templet to a temperature above its plastic set temperature, usually about 1,200° F., then form the templet to its desired curvature by either gravity forming or press bending the glass, and finally rapidly quench the formed glass sheet by directing streams of a tempering fluid, usually air, against the major surfaces thereof. During the tempering operation, it is known to support the formed glass sheet on a support ring, comprising a rigid structure conforming generally in outline and elevation to the peripheral marginal surface of the formed glass sheet. In some operations, the support ring is initially used for press bending the glass templet, or as a mold for gravity forming the glass templet to the desired final curvature, prior to its use as a tempering support ring.

During a glass tempering operation, blasts of tempering fluid rapidly cool the formed glass sheet in all areas, except the area of contact between the glass sheet and the support ring where cooling is retarded due to restricted tempering fluid flow. Thus, the majority of the cooled glass sheet is stressed in compression, while the area of the glass sheet which is adjacent the support ring is stressed in tension. This stress imbalance often leads to spontaneous breakage of the ultimately produced formed and tempered glass sheet. Moreover, uniform cooling of the surfaces of the formed glass sheet is practically impossible due to conductive heat transfer which occurs adjacent the areas of direct contact between the formed glass sheet and the support ring.

The support rings disclosed in the prior art generally were designed to allow increased tempering fluid flow and to minimize conductive heat transfer in the vicinity of the contact area between the formed glass sheet and support ring.

U.S. Pat. No. 3,089,319 to Carson et al. discloses a glass sheet gravity forming apparatus, including a support ring having solid metal rails which contact the peripheral marginal surface of the formed glass sheet. The device, having the formed glass sheet resting thereon, may be shuttled to a tempering station where blasts of tempering air are directed at the major surfaces of the glass sheet. The patent states that there is a compelling need for an absolute minimum of contact between the formed glass sheet and the support ring, to effect proper, uniform tempering.

U.S. Pat. No. 3,846,104 to Seymour discloses apparatus for handling glass sheets during shaping and cooling, including a conventional tempering ring with serations and apertures therein to reduce the glass sheet contact area and to increase the flow therearound of tempering air.

U.S. Pat. No. 3,973,943 to Seymour discloses a support ring for tempering a formed glass sheet, wherein a serated and apertured non-metallic ring is affixed to a conventional tempering ring. The peripheral marginal surface of the hot, formed glass sheet contacts only the non-metallic material during the tempering operation so as to minimize conductive heat transfer from the glass sheet to the support ring.

U.S. Pat. Nos. 2,408,526 to Minton and 3,310,273 to Seymour disclose formed glass sheet support rings having asbestos and wire mesh, respectively, placed over rigid support members, to reduce the amount of heat conducted from the glass sheets to the support rings.

U.S. Pat. Nos. 4,556,407 and 4,556,408 to Fecik et al. disclose formed glass sheet tempering rings having discrete upstanding support members including non-metallic support blocks which contact the peripheral marginal surfaces of the glass sheets.

Finally, U.S. Pat. No. 4,812,157 to Smith discloses a formed glass sheet support ring, comprising a support rail having a plurality of adjustable, upstanding stanchions with convex apecies. It is difficult, however, to initially establish a continuous series of glass sheet peripheral marginal surface contact points, since the elevation of each stanchion must be set individually in a fashion so that no single stanchion bears a substantially greater weight of the glass sheet than any adjacent stanchion (or the glass sheet will be deformed by the stanchion bearing the greater weight).

It would be desirable to create a glass sheet support ring configuration which could be assembled simply, and which would allow for greater tempering fluid flow therearound while minimizing the conductive heat transfer from the peripheral marginal surface of the formed glass sheet to the support ring. Such a ring could be used exclusively for supporting a formed glass sheet during a tempering operation, or could additionally be used as a press rail in a glass sheet press bending operation or as a mold ring in a glass sheet gravity forming operation.

SUMMARY OF THE INVENTION

Accordant with the present invention, a support ring for supporting a formed glass sheet during a tempering operation, which support ring allows for greater tempering fluid flow therearound while minimizing conductive heat transfer from the peripheral marginal surface thereof to the ring, has surprisingly been discovered. The inventive support ring comprises:

A) a support rail generally conforming in outline and elevation to the peripheral marginal surface of the glass sheet;

B) a plurality of spaced-apart glass sheet engaging elements, each having a bore therethrough, said glass sheet engaging elements disposed generally in a line parallel to the support rail such that said bores are substantially parallel to the outline of the support rail; and C) means for affixing the glass sheet engaging elements to the support rail, including a wire disposed through the bores of said glass sheet engaging elements.

The glass sheet engaging elements are preferably made from a non-metallic material, e.g., a synthetic graphite, and may be shaped so as to result in point, line, or surface contact with the peripheral marginal surface of a glass sheet supported thereon.

The wire disposed through the bores of the glass sheet engaging elements is laterally flexible, allowing generally equal distribution of the weight of the glass sheet on adjacent glass sheet engaging elements. This prevents deformation of the glass sheet by a glass sheet engaging element which might otherwise inadvertently be positioned at a higher elevation than adjacent elements.

The apparatus of the present invention is particularly well suited for supporting a formed glass sheet thereon during a tempering operation.

BRIEF DESCRIPTION OF THE DRAWINGS

The novel features that are considered characteristic of the invention are set forth with particularity in the appended Claims. The invention will best be understood, however, by reference to the accompanying description of specific embodiments when read in connection with the attendant FIGS. in which:

FIG. 1 is a perspective view of a glass sheet support frame including a support ring embodying the features of the present invention;

FIG. 2 is an enlarged fragmentary view, partially cut away, of the glass sheet engaging portion of a support ring according to the present invention;

FIG. 3 is a front elevational fragmentary view of the glass sheet engaging portion of the support ring of FIG. 2;

FIGS. 4–7 are perspective views of alternatively shaped glass sheet engaging members for use with the support ring of the present invention.

DETAILED DESCRIPTION OF THE PREFERRED EMBODIMENT

The present invention is directed to a ring for supporting a glass sheet, by contact with the peripheral marginal portion of the underside major surface of the glass sheet. The configuration of the ring and the use of glass sheet engaging elements provides for substantially uniform tempering, by allowing increased tempering fluid flow near the peripheral marginal surface of the glass sheet and by minimizing conductive heat transfer from the hot glass sheet to the support ring.

Generally, a roller-hearth or gas-hearth furnace is used to heat glass sheets prior to forming and tempering operations. The glass sheets are advanced along a horizontal path through the furnace to a forming station, whereat the glass sheets are formed by well-known processes such as, for example, press bending or gravity forming utilizing gas-hearth forming blocks or a gravity mold. Following the forming of the glass sheets to a precise desired curvature, the formed glass sheets are conveyed on a support ring through a tempering station, whereat the surfaces of the formed glass sheets are quickly cooled by passage thereof between opposed tempering fluid blastheads. Finally, the tempered glass sheets are conveyed out from the tempering station to an unloading station, whereat the glass sheets are removed from the support ring and deposited on a take-away roller conveyor.

The configuration of the support ring used during the tempering operation is critical for achieving uniform, stress-imbalance-free tempering of the glass sheet. The support ring, having the formed glass sheet resting thereon, is advanced generally horizontally between blastheads comprising a plurality of nozzles adapted to direct opposed streams of a cooling fluid such as, for example, moist air toward and against the opposite major surfaces of the glass sheet. The inventive support ring provides minimum contact with the peripheral marginal surface of the glass sheet and maximum tempering fluid flow in the area adjacent the glass sheet engagement elements of the support ring.

The present invention contemplates a support ring which is adapted to receive an already-formed glass sheet, and shuttle same through a tempering station. The invention further contemplates a support ring which participates in the glass sheet forming operation prior to the formed glass sheet tempering operation. In other words, the support ring of the present invention can additionally serve as a press bending rail or gravity forming mold, and can thereafter immediately be used to support and shuttle the formed glass sheet during a subsequent tempering operation.

Referring now to the drawings, and in particular to FIG. 1, there is shown generally at 10 a support ring system embodying the features of the present invention. The support ring 12 itself is affixed to a generally rectangular frame 14 by means of a plurality of connecting rods 16. The support ring frame 14 may be shuttled into and out from a tempering station by means of conventional mechanical apparatus (not shown) such as, for example, robotically operated positioning arms connected to extensions 18 of the frame 14.

As illustrated more clearly in FIG. 2, the support ring comprises, inter alia, a support rail 20, having a support bar 22 affixed thereto by means of a plurality of screws 24. The support rail 20 generally conforms in outline and elevation to the peripheral marginal surface of a formed glass sheet S deposited or formed thereon. The support bar 22 includes a plurality of rigidly attached, generally parallel, perforated support arms 26, which extend inwardly toward the interior of the support ring 12, thence upwardly so as to form upstanding wire support extensions 28. Apertures 30 near the termini of the upstanding wire support extensions 28 are adapted to receive a wire 32 therethrough. Glass sheet engaging elements 34, having bores 36 therethrough for receiving the wire 32, are positioned intermediate adjacent support extensions 28. The bores 36 are substantially parallel to the outline of the support rail 20. The wire 32 diameter is chosen so that the wire 32 fits loosely in the coaxial apertures 30 of the upstanding wire support extensions 28, and the diameter of the bores 36 of the glass sheet engaging elements 34 is chosen so that the elements 34 fit loosely on the wire 32. This allows increased tempering fluid flow around and through the various points of contact between the glass sheet engaging elements 34 and the support rail 20. By the term "wire" as it is used herein is meant an elongate, laterally flexible and longitudinally inextensible structure, having any cross section (but generally of circular cross section), and made from any well-known filiform material, e.g., fiberglass or metal filaments. A preferred wire comprises a multi-stranded stainless steel wire. The wire flexibility results in a generally even distribution of the weight of the glass sheet upon adjacent glass sheet engaging elements.

As shown in FIG. 2, the glass sheet engaging elements 34 may be in the shape of cylinders, which engage the peripheral marginal surface of the glass sheet generally by interrupted line contact at the apogean generatricies of each cylinder. Other glass sheet engaging elements 34', 34", 34''', and 34'''', having the same operability and utility, are shown by way of example but not limitation in FIGS. 4, 5, 6 and 7, respectively, as a bicone, a spheroid, an elipsoid and a cube. Glass sheets engaging elements 34', 34'', and 34''', of course, result generally in a series of point contacts with the peripheral marginal surface of the glass sheet. Also contemplated by the present invention are glass sheet engaging elements having shapes which would result in areas of surface contact with the peripheral marginal surface of the glass sheet, such as for example, a cube as illustrated in FIG. 7.

Various components of the support ring 12, e.g., the support rail 20, support bar 22, support arms 26, and wire 32, conveniently may be fabricated from temperature- and corrosion-resistant materials such as, for example, various grades of stainless steel. The glass sheet support elements 34 likewise may be made from a variety of temperature- and corrosion-resistant materials. Preferably, the glass sheet engaging elements 34 are made from a non-metallic material such as a ceramic or fiber composite. A particularly preferred material, having a very low thermal conductivity, comprises a synthetic graphite such as is sold by Poco Graphite, Inc. of Decatur, TX under the trademark GLASSMATE.

While certain representative embodiments and details have been shown for the purpose of illustrating the present invention, it will be apparent to those ordinarily skilled in the art that various changes in applications can be made therein, and that the invention may be practiced otherwise than as specifically illustrated and described without departing from its spirit and scope. For example, the apparatus of the present invention may be used to support flat as well as formed glass sheets. It is well-known in the glass industry that certain architectural glazings must be made from tempered glass, and the present invention may be utilized for supporting a flat glass sheet during such a tempering operation.

What is claimed is:

1. Apparatus for supporting a glass sheet, comprising:
   A) a support rail generally conforming in outline and elevation to the peripheral marginal surface of the glass sheet;
   B) a plurality of spaced-apart glass sheet engaging elements, each having a bore therethrough, said glass sheet engaging elements disposed generally in a line parallel to the support rail such that said bores are substantially parallel to the outline of the support rail; and
   C) means for affixing the glass sheet engaging elements to the support rail, including a wire disposed through the bores of said glass sheet engaging elements.

2. The apparatus for supporting a glass sheet according to claim 1, wherein the glass sheet engaging elements have a geometry which would result in point contacts between said elements and the peripheral marginal surface of a glass sheet supported thereon.

3. The apparatus for supporting a glass sheet according to claim 1, wherein the glass sheet engaging elements have a geometry which would result in line contacts between said elements and the peripheral marginal surface of a glass sheet supported thereon.

4. The apparatus for supporting a glass sheet according to claim 1, wherein the glass sheet engaging elements have a geometry which would result in surface contacts between said elements and the peripheral marginal surface of a glass sheet supported thereon.

5. The apparatus for supporting a glass sheet according to claim 1, wherein the glass sheet engaging elements are made from a non-metallic material.

6. The apparatus for supporting a glass sheet according to claim 5, wherein the non-metallic material comprises a synthetic graphite.

7. The apparatus for supporting a glass sheet according to claim 1, wherein the wire is a multi-stranded stainless steel wire.

8. Apparatus for supporting a formed glass sheet during a tempering operation, comprising:
   A) a support rail generally conforming in outline and elevation to the peripheral marginal surface of the formed glass sheet;
   B) a plurality of spaced-apart non-metallic glass sheet engaging elements, each having a bore therethrough, said glass sheet engaging elements disposed generally in a line parallel to the support rail such that said bores are substantially parallel to the outline of the support rail; and
   C) means for affixing the glass sheet engaging elements to the support rail, including a stainless steel wire disposed through the bores of said glass sheet engaging elements.

9. The apparatus for supporting a formed glass sheet during a tempering operation according to claim 8, wherein the non-metallic glass sheet engaging elements have a geometry which would result in point contacts between said elements and the peripheral marginal surface of a formed glass sheet supported thereon.

10. The apparatus for supporting a formed glass sheet during a tempering operation according to claim 8, wherein the non-metallic glass sheet engaging elements have a geometry which would result in line contacts between said elements and the peripheral marginal surface of a formed glass sheet supported thereon.

11. The apparatus for supporting a formed glass sheet during a tempering operation according to claim 8, wherein the non-metallic glass sheet engaging elements have a geometry which would result in surface contacts between said elements and the peripheral marginal surface of a formed glass sheet supported thereon.

12. The apparatus for supporting a formed glass sheet during a tempering operation according to claim 8, wherein the non-metallic material comprises a synthetic graphite.

* * * * *